United States Patent
Kasaoka et al.

(10) Patent No.: US 7,573,227 B2
(45) Date of Patent: Aug. 11, 2009

(54) CONTROLLER AND CONTROL METHOD OF PERMANENT MAGNET TYPE ROTARY MOTOR

(75) Inventors: Kota Kasaoka, Sakura (JP); Hideki Inoue, Nasushiobara (JP)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 11/812,859

(22) Filed: Jun. 22, 2007

(65) Prior Publication Data
US 2008/0007199 A1 Jan. 10, 2008

(30) Foreign Application Priority Data
Jun. 26, 2006 (JP) .............................. 2006-175220

(51) Int. Cl.
*H02P 27/04* (2006.01)
(52) U.S. Cl. .................. 318/807; 318/721; 318/727; 318/801; 318/701
(58) Field of Classification Search ................. 318/701, 318/717, 727, 801, 807, 722
See application file for complete search history.

(56) References Cited

U.S. PATENT DOCUMENTS

| | | | |
|---|---|---|---|
| 6,636,012 B2* | 10/2003 | Royak et al. ................. | 318/727 |
| 6,700,400 B2 | 3/2004 | Atarashi | |
| 6,876,169 B2* | 4/2005 | Gallegos-Lopez et al. .. | 318/701 |
| 2003/0062870 A1* | 4/2003 | Royak et al. ................. | 318/727 |
| 2003/0128009 A1* | 7/2003 | Sakurai et al. .............. | 318/722 |
| 2003/0169015 A1* | 9/2003 | Royak et al. ................. | 318/727 |
| 2004/0135538 A1* | 7/2004 | Gallegos-Lopez et al. .. | 318/807 |
| 2004/0263111 A1* | 12/2004 | Royak et al. ................. | 318/798 |
| 2005/0146306 A1* | 7/2005 | Ha et al. ...................... | 318/807 |
| 2006/0125439 A1* | 6/2006 | Ajima et al. ................. | 318/716 |
| 2007/0046249 A1* | 3/2007 | Tomigashi et al. .......... | 318/807 |
| 2007/0069681 A1* | 3/2007 | Imura et al. ................. | 318/717 |
| 2007/0132415 A1* | 6/2007 | Patel et al. ................... | 318/432 |
| 2007/0159131 A1* | 7/2007 | Kitanaka .................... | 318/807 |
| 2007/0205743 A1* | 9/2007 | Takahashi et al. .......... | 318/807 |
| 2007/0236167 A1* | 10/2007 | Tomigashi .................. | 318/721 |
| 2008/0001571 A1* | 1/2008 | Tomigashi .................. | 318/721 |
| 2008/0018296 A1* | 1/2008 | Hashimoto et al. .......... | 318/807 |
| 2008/0079385 A1* | 4/2008 | Hashimoto et al. .......... | 318/801 |
| 2008/0303471 A1* | 12/2008 | Fujishiro .................... | 318/563 |

FOREIGN PATENT DOCUMENTS

| | | | |
|---|---|---|---|
| JP | 11299298 A | 10/1999 | |
| JP | 2002-095300 A | 3/2002 | |

* cited by examiner

Primary Examiner—Paul Ip
(74) Attorney, Agent, or Firm—Arent Fox LLP (57) ABSTRACT

A controller of a permanent magnet type rotary motor of the present invention includes: a current difference calculator decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference component, a field-axis inductance, and a torque-axis inductance; and a target current corrector correcting a field-axis target current and a torque-axis target current in the rotatory magnetic flux coordinate so that current difference components are zero.

6 Claims, 5 Drawing Sheets

CONTROLLER AND CONTROL METHOD OF PERMANENT MAGNET TYPE ROTARY MOTOR

BACKGROUND OF THE INVENTION

1. Field of the Invention

The present invention relates to a controller and a control method of a permanent magnet type rotary motor.

Priority is claimed on Japanese Patent Application No. 2006-175220, filed Jun. 26, 2006, the contents of which are incorporated herein by reference.

2. Description of the Related Art

A conventional controller has been known for controlling voltage applied to an armature from a stator, which generates rotating magnetic field for rotating a rotator, to be less than a maximum voltage corresponding to source voltage by a vector control using a rotatory magnetic flux coordinate in which a field direction of a rotator having a permanent magnet is defined as a field axis and a direction perpendicular to the field axis is defined as a torque axis (for example, refer to Japanese Unexamined Patent Application, First Publication No. 2002-95300).

In the controller, when a counter electromotive force increases depending on operating conditions of an electric motor and a voltage magnitude applied to the electric motor becomes more than the maximum voltage corresponding to the source voltage, a weak field control of controlling a current phase is performed by correcting a field-axis target current so as to equivalent weaken an intensity of magnetic field of the rotator.

However, in the conventional controller in a coordinate plane in which the torque axis is defined as a Y axis and a field axis is defined as an X axis, when the voltage magnitude exists in the first quadrant and the second quadrant, that is, when a voltage advance is less than 180°, the voltage magnitude can be converged into the inside of a maximum source voltage by a weak field control.

However, when the voltage magnitude exists in the third quadrant, that is, when the voltage advance is 180° or more, the voltage magnitude cannot be converged to be less than the maximum source voltage by the weak field control.

Figure 5:
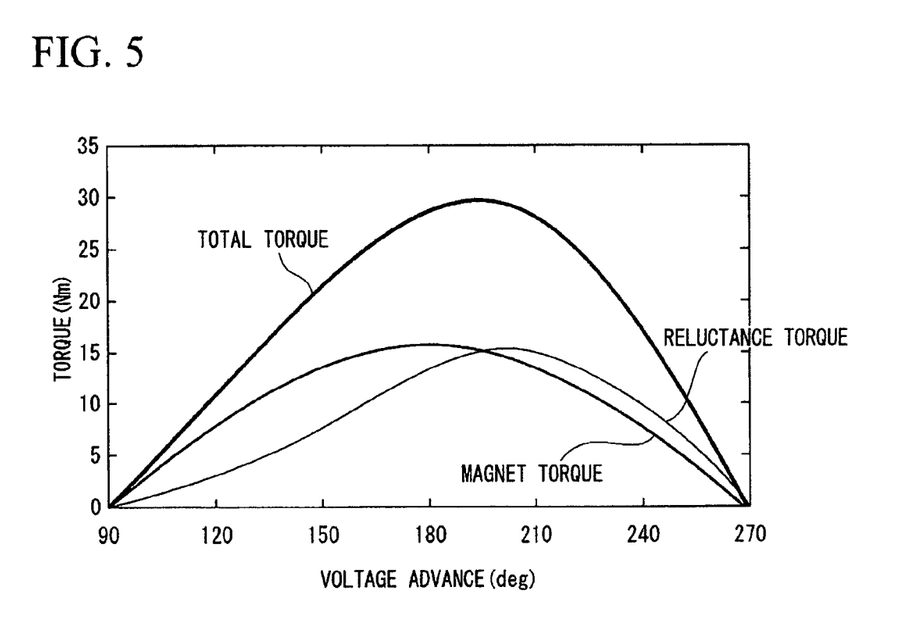
FIG. 5 is a graph illustrating the variation of total torque, magnet torque, and reluctance torque depending on the voltage advance in the permanent magnet type rotary motor according to the embodiment of the present invention.

Specifically, in an electric motor for rotating a rotator by the use of a magnet torque between a rotating magnetic field generated by the armature and a permanent magnet of the rotator, and a rotating torque between the rotating magnetic field and a magnet core of the rotator, that is, a reluctance torque as shown in FIG. 5, the possible total torque is in maximum in an area in which a voltage advance is 180° or more. Accordingly, it is required that an electrification corresponding to a source voltage is properly controlled on the voltage magnitude in the third quadrant.

The present invention was made in view of the above-mentioned circumstances and has an object of providing a controller and a control method of a permanent magnet type rotary motor capable of performing an appropriate electrification control.

SUMMARY OF THE INVENTION

The present invention employs the followings to achieve the above-mentioned object.

That is, one aspect of the present invention is a controller of a permanent magnet type rotary motor, the controller including: a permanent magnet type rotary motor including a rotator which has a permanent magnet and a stator which has an armature generating a rotating magnetic field for rotating the rotator; a magnetic pole position detector detecting a magnetic pole position of the rotator; a current controller setting a phase of an armature voltage applied to the armature depending on the magnetic pole position and controlling an armature current flowing in the armature by a vector control using a rotatory magnetic flux coordinate in which a field direction of the rotator is defined as a field axis and a direction perpendicular to the field axis is defined as a torque axis; a current difference calculator decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference component, a field-axis inductance, and a torque-axis inductance; and a target current corrector correcting a field-axis target current and a torque-axis target current in the rotatory magnetic flux coordinate so that the current difference components are zero.

According to the controller of a permanent magnet type rotary motor, a field-axis current difference component and a torque-axis current difference component can be calculated from the primary voltage difference which is a difference between the primary voltage and the maximum voltage so as to correct the field-axis target current and the torque-axis target current. With such a configuration, when a voltage advance of the primary voltage is 180° or more, the primary voltage may be converged properly to the maximum voltage or less corresponding to the source voltage. Accordingly, it is possible to properly perform the electrification control, compared with the case of correcting only the field-axis target current.

In addition, the other aspect of the present invention is a controller of a permanent magnet type rotary motor, the controller including: a permanent magnet type rotary motor including a rotator which has a permanent magnet and a stator which has an armature generating a rotating magnetic field for rotating the rotator; a magnetic pole position detector detecting a magnetic pole position of the rotator; a current controller setting a phase of an armature voltage applied to the armature depending on the magnetic pole position and controlling an armature current flowing in the armature by a vector control using a rotatory magnetic flux coordinate in which a field direction of the rotator is defined as a field axis and a direction perpendicular to the field axis is defined as a torque axis; a current difference calculator decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference component, a field-axis inductance, and a torque-axis inductance; a composite current difference calculator compositing the current difference components on the basis of a current phase angle corresponding to the phase angle of the primary voltage and calculating a composite current difference; and a target current corrector correcting a field-axis target current and a torque-axis target current in the rotatory magnetic flux coordinate so that the composite current difference is zero.

According to the controller of a permanent magnet type rotary motor, a field-axis current difference component and a torque-axis current difference component can be calculated from the primary voltage difference which is a difference between the primary voltage and the maximum voltage so as to correct the field-axis target current and the torque-axis target current. With such a configuration, when a voltage advance of the primary voltage is 180° or more, the primary voltage may be converged properly to the maximum voltage or less corresponding to the source voltage. Accordingly, it is possible to properly perform the electrification control, compared with the case of correcting only the field-axis target current.

It may be arranged such that: the target current corrector includes a corrected composite current calculator performing a control operation on the composite current difference and calculating an amount of corrected composite current, and a corrected current calculator decomposing the amount of corrected composite current into a field-axis corrected current component and a torque-axis corrected current component in the rotatory magnetic flux coordinate by the use of the current phase; and the field-axis target current and the torque-axis target current are corrected so that the corrected current components are zero.

In this case, a control operation (for example, multiplication of a control gain) is performed on a composite current difference obtained by compositing the field-axis current difference component and the torque-axis current difference component so as to correct the field-axis target current and the torque-axis target current. The corrected composite current obtained by the control operation is decomposed into the field-axis corrected current component and the torque-axis corrected component. Accordingly, when a detection error of the phase angle or an angle deviation exists, it is possible to prevent the deviation in a correction direction of the current and the voltage in the rotatory magnetic flux coordinate.

In addition, the other aspect of the present invention is a control method of a permanent magnet type rotary motor including: a permanent magnet type rotary motor including a rotator which has a permanent magnet and a stator which has an armature generating a rotating magnetic field for rotating the rotator; a magnetic pole position detector detecting a magnetic pole position of the rotator; and a current controller setting a phase of an armature voltage applied to the armature depending on the magnetic pole position, and controlling an armature current flowing in the armature by a vector control using a rotatory magnetic flux coordinate in which a field direction of the rotator is defined as a field axis and a direction perpendicular to the field axis is defined as a torque axis, the control method including: a current difference calculating process of decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference components, a field-axis inductance, and a torque-axis inductance; and a target current correcting process of correcting a field-axis target current and a torque-axis target current in the rotatory magnetic flux coordinate so that the current difference components are zero.

In addition, the other aspect of the present invention is a control method of a permanent magnet type rotary motor including: a permanent magnet type rotary motor including a rotator which has a permanent magnet and a stator which has an armature generating a rotating magnetic field for rotating the rotator; a magnetic pole position detector detecting a magnetic pole position of the rotator; and a current controller setting a phase of an armature voltage applied to the armature depending on the magnetic pole position, and controlling an armature current flowing in the armature by a vector control using a rotatory magnetic flux coordinate in which a field direction of the rotator is defined as a field axis and a direction perpendicular to the field axis is defined as a torque axis, the control method including: a current difference calculating process of decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference components, a field-axis inductance, and a torque-axis inductance; a composite current difference calculating process of compositing the current difference components on the basis of a current phase angle corresponding to the phase angle of the primary voltage, and calculating a composite current difference; and a target current correcting process of correcting a field-axis target current and a torque-axis target current in the rotatory magnetic flux coordinate so that the composite current difference is zero.

It may be arranged such that: the target current correcting process includes: a composite current corrected amount calculation process of performing a control operation on the composite current difference, and calculating an amount of corrected composite current; and a corrected current amount calculation process of decomposing the amount of corrected composite current into a field-axis corrected current component and a torque-axis corrected current component in the rotatory magnetic flux coordinate by the use of the current phase angle; and a correcting process of correcting the field-axis target current; and the control method of a permanent magnet type rotary motor further comprising a correcting process of correcting the field-axis corrected current component and the torque-axis target current so that the corrected current components are zero.

DETAILED DESCRIPTION OF THE INVENTION

One embodiment of a controller and a control method of a permanent magnet type rotary motor according to the present invention will be described below with reference to the drawings.

Figure 1:
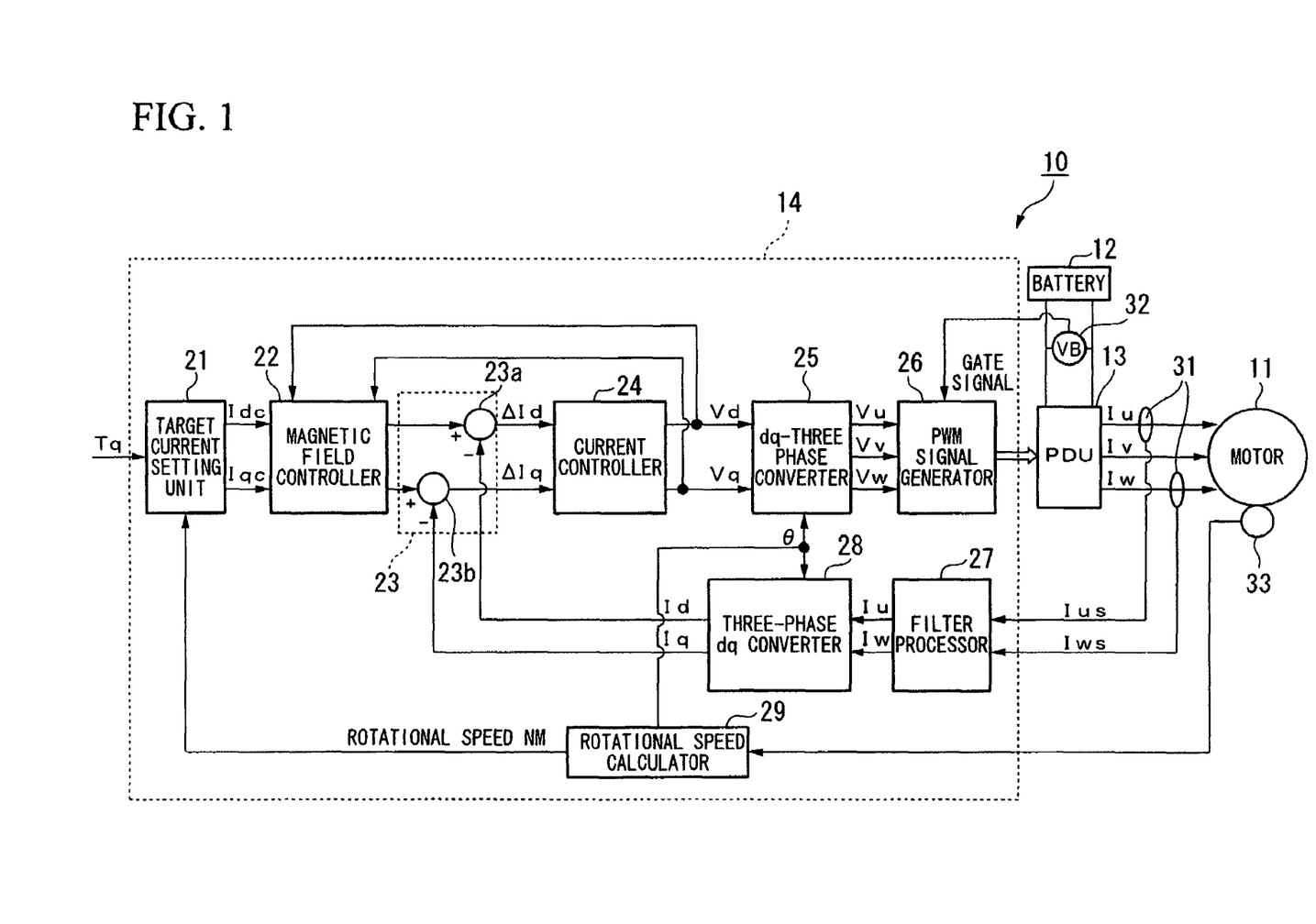
FIG. 1 is a diagram illustrating a configuration of a controller of a permanent magnet type rotary motor according to an embodiment of the present invention.

A controller of a permanent magnet type rotary motor 10 (hereinafter, referred to as a motor controller 10) of the embodiment, as shown in FIG. 1, drives a brushless DC motor 11 (hereinafter, referred to as a motor 11) which is mounted on an automobile as a driving source in a hybrid car, or the like. The motor 11 includes a rotator (not shown) and a stator (not shown) generating a rotating magnetic field for rotating the stator, which is used in a magnetic field system.

The motor controller 10 includes a power drive unit (PDU) 13 which has a battery 12 as a direct current source and a controller 14.

In the motor controller 10, a driving or a regenerating operation of the motor 11 of a plurality of phases (for example, three-phases of U-phase, V-phase, and W-phase) can be performed by the power drive unit (PDU) 13 after receiving a control instruction outputted from the controller 14.

The PDU 13 includes a PWM inverter having a bridge circuit in which a plurality of switching elements as transistors is bridge-connected and performs a pulse wave modulation (PWM). The PDU 13 is connected to a high-voltage battery 12 which gives and receives the electrical energy to and from the motor 11.

The PDU 13 converts DC power supplied from the battery 12 into three-phase AC power by switching the on (connection)/off (disconnection) state of the transistors forming pairs every phase in the PWM inverter on the basis of a gate signal (that is, PWM signal) which is a switching instruction inputted from the controller 14 at the time of driving when the motor 11 starts driving. Then, by sequentially electrifying the stator coils of the three-phase motor 11, AC U-phase current Iu, AC V-phase current Iv, and AC W-phase current Iw are supplied to the stator coils of the phases.

The controller 14 performs a current feedback control in a dq coordinate constituting a rotating rectangular coordinate system. The controller 14 calculates a d-axis current instruction Idc and a q-axis current instruction Iqc on the basis of a torque instruction Tq which is set by an accelerator opening degree associated with a driver's accelerator operation. The controller 14 calculates the phase output voltages Vu, Vv, and Vw on the basis of the d-axis current instruction Idc and the q-axis current instruction Iqc. The controller 14 inputs a gate signal PWM to the PDU 13 depending on the phase output voltages Vu, Vv, and Vw. The controller 14 control differences between the d-axis current Id and q-axis current Iq obtained by converting at least two phase currents among the phase currents Iu, Iv, and Iw, which are supplied from the PDU 13 to the motor 11, into a current in a dq coordinate and between the d-axis current instruction Idc and the q-axis current instruction Iqc so as to be zero.

The controller 14 includes a target current setting unit 21, a magnetic field controller 22, a current difference calculator 23, a current controller 24, a dq-three-phase converter 25, a PWM signal generator 26, a filter processor 27, a three phase-dq converter 28, and a rotational speed calculator 29.

In the controller 14, detected signals Ius and Iws outputted from current sensors 31 and 31 detecting a U-phase current Iu of two phases and a W-phase current Iw of two phases among the three-phases currents Iu, Iv, and Iw outputted from the PDU 13 to the motor 11, a detected signal outputted from a voltage sensor 32 detecting a terminal voltage (source voltage) VB of the battery 12, a detected signal outputted from a rotatory sensor 33 detecting a rotating angle θM of the rotator of the motor 11 (that is, the rotating angle of the magnetic pole of the rotator from a predetermined reference position), and a torque instruction Tq outputted from an external controller (not shown) are inputted.

The target current setting unit 21 calculates the torque instruction Tq (for example, an instruction value so as to generate a required torque in accordance with an amount of pushing operation of the accelerator to the motor 11 by a driver) inputted from the external controller (not shown) and a current instruction which determines the phase currents Iu, Iv, and Iw supplied from the PDU 13 to the motor 11 on the basis of a rotational speed NM of the motor 11 inputted from the rotational speed calculator 29. The current instruction is outputted to the magnetic field controller 22, which serves as the d-axis target current Idc and the q-axis target current Iqc on the rotating rectangular coordinate system.

In the dq coordinate being the rotating rectangular coordinate system, a magnetic flux direction of a magnetic field pole generated from a permanent magnet of the rotator is defined as a d axis (magnetic field axis), and the direction perpendicular to the d axis is defined as a q axis (torque axis). The dq coordinate rotates in synchronization with the rotation phase of the rotator in the motor 11. With such a configuration, a d-axis target current Idc and a q-axis target current Iqc are applied as current instructions to the AC signal supplied to the phases of the motor 11 from the PDU 13.

The magnetic field controller 22, as described below, corrects the d-axis target current Idc and the q-axis target current Iqc so that a counter electromotive voltage increasing the rotational speed NM of the motor 11 is suppressed.

The current difference calculator 23 includes a d-axis current difference calculator 23a which calculates a difference ΔId between a d-axis target current Idc and a d-axis current Id which are inputted from the magnetic field controller 22, and a q-axis current difference calculator 23b which calculates a difference ΔIq between the q-axis target current Iqc and the q-axis current Iq which are inputted from the magnetic field controller 22.

The current controller 24 amplifies the difference ΔId by a PI operation (proportional plus integral) in accordance with the rotational speed NM of the motor so that a d-axis voltage instruction value Vd is calculated. The difference ΔIq is amplified so that a q-axis voltage instruction value Vq is calculated.

The dq-three phase converter 25 converts the d-axis voltage instruction value Vd and the q-axis voltage instruction value Vq on the dq coordinate into a U phase output voltage Vu, a V phase output voltage Vv, and a V phase output voltage Vv, and a W phase output voltage Vw, respectively, using a rotation angle θM of the rotator inputted from the rotational speed calculator 29.

The PWM signal generator 26 generates gate signal (that is, a PWM signal) which is a switching instruction including the pulses for turning on and off the switching elements of the PWM inverter of the PDU 13 by a pulse width variation based, for example, on the phase output voltages Vu, Vv, and Vw having a sinusoidal wave form, a carrier signal having a triangular wave form, and the switching frequency.

The filter processor 27 performs a filtering process to the detected respective current Ius and Iws such as removing a high frequency component corresponding to the phase currents detected by the current sensors 31 and 31, and extracts the respective phase currents Iu and Iw as physical quantity.

A three phase-dq converter 28 calculates a d-axis current Id and a q-axis current Iq in a rotation coordinate, that is, dq coordinate, by the rotation phase of the motor 11 on the basis of the currents Iu and Iw extracted from the filter processor 27 and rotation angle θM of the rotator inputted from rotational speed calculator 29.

The rotational speed calculator 29 extracts the rotation angle θM of the rotator of the motor 11 by the detected signal outputted from the rotatory sensor 33 and calculates the rotational speed NM of the motor 11 on the basis of the rotation angle θM.

The operation of the motor controller 10 of the permanent magnet type rotary motor having the above-mentioned configuration, and specifically the operation of the magnetic field controller 22 will be described below with reference to the attached drawings.

Figure 2:
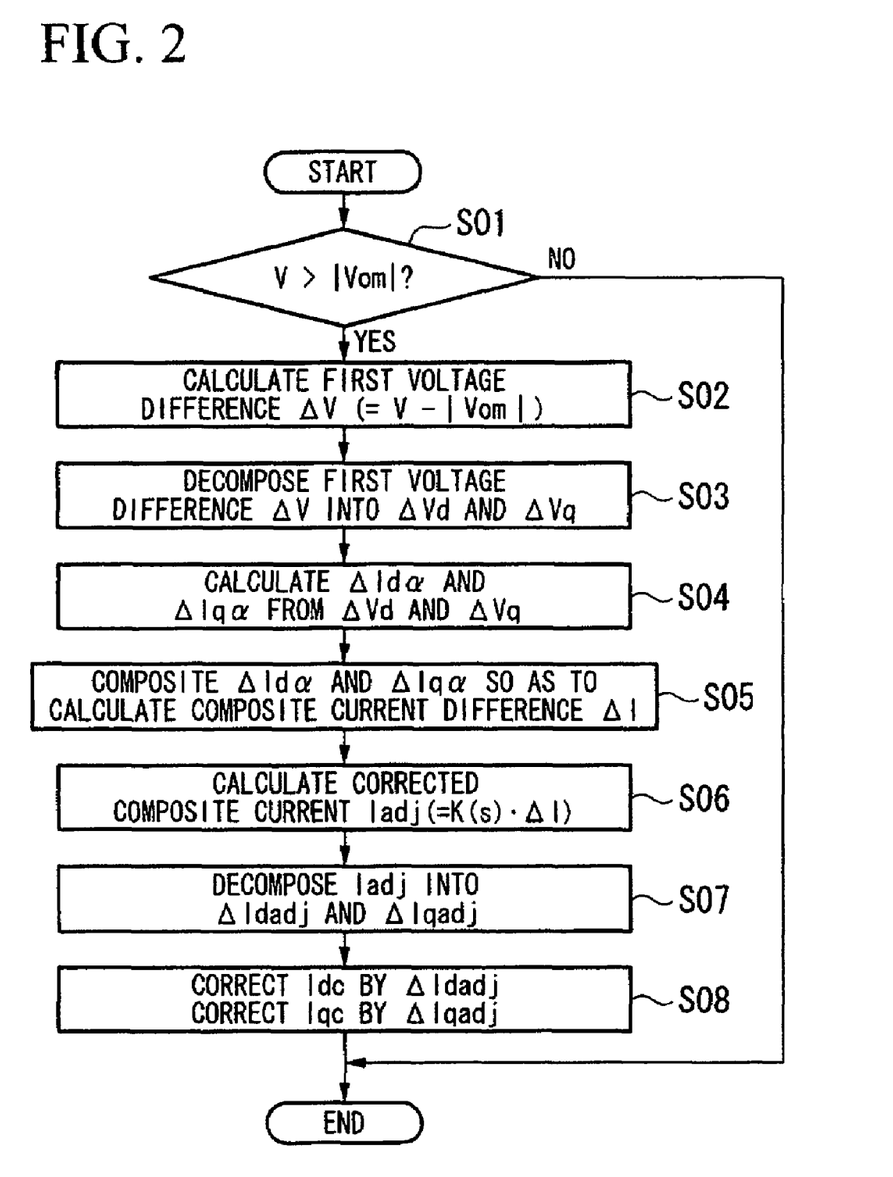
FIG. 2 is a flow chart illustrating an operation of the controller of the permanent magnet type rotary motor according to the embodiment of the present invention.
Figure 3:
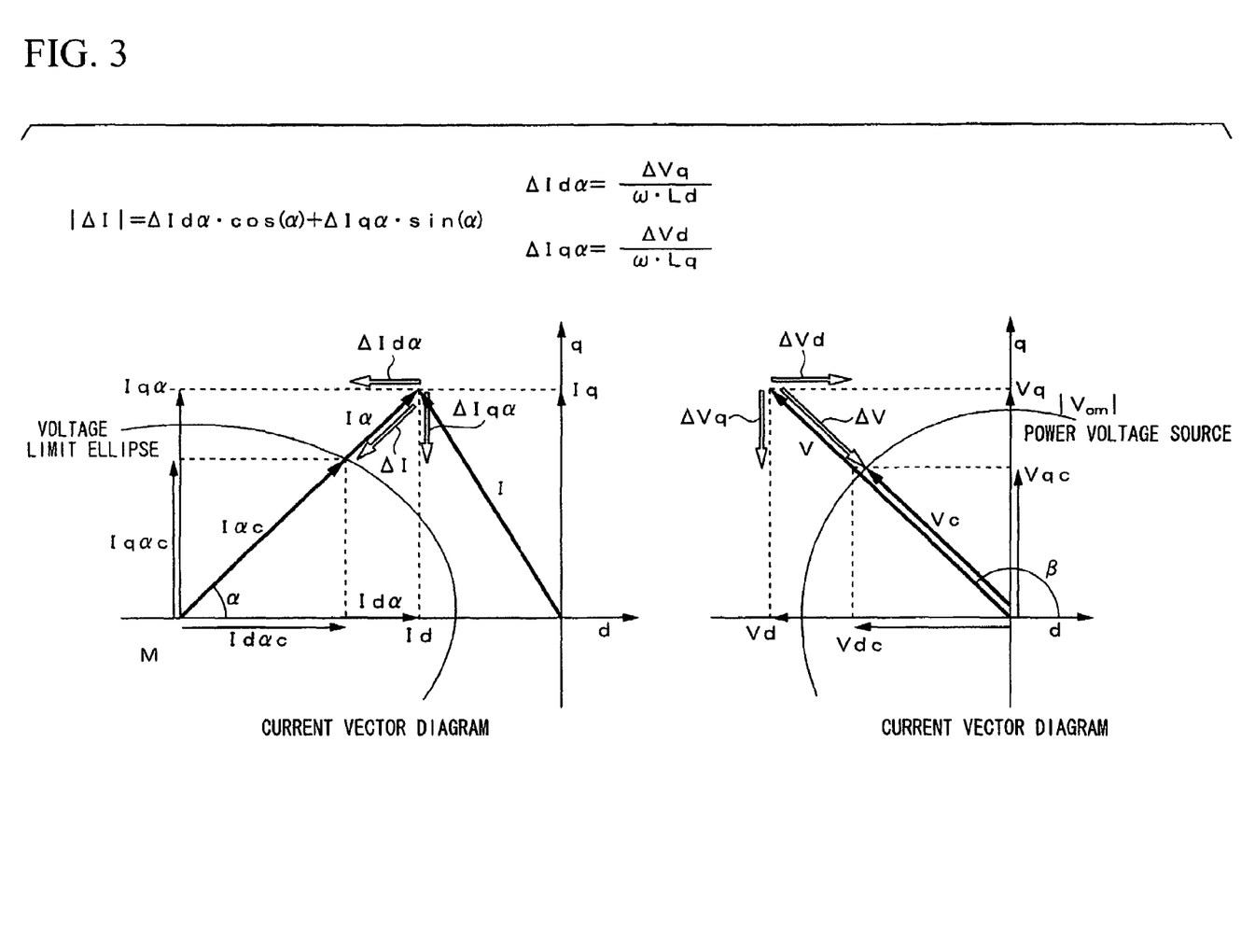
FIG. 3 is a graph illustrating an example of a voltage vector diagram and a current vector diagram according to the embodiment of the present invention.

Firstly in the process of step S01 shown in FIG. 2, the magnetic field controller 22 calculates a primary voltage V which will be described by Equation (1), in accordance with the d-axis voltage instruction Vd outputted from the current controller 24 and the q-axis voltage instruction Vq. The magnetic field controller 22 determines whether the primary voltage V is greater than a predetermined maximum voltage corresponding to the source voltage VB, for example, a source voltage magnitude |Vom| in the voltage vector shown in FIG. 3.

If the determination is "NO", then a series of processes are ended.

On the other hand, if the determination is "YES", then the process proceeds to step S02.

$$V = \sqrt{Vd^2 + Vq^2} \qquad (1)$$

In the process of step S02, a primary voltage difference ΔV (=V−|Vom|) is calculated, which is a difference between the primary voltage V and the source voltage magnitude |Vom|.

In the process of step S03, as represented in Equation (2), the primary voltage difference ΔV is decomposed into d-axis voltage difference component ΔVd and q-axis voltage difference component ΔVq on the dq coordinate in accordance with a phase angle β of the primary voltage V.

$$\left. \begin{array}{l} \beta = \tan^{-1}\left(\dfrac{Vq}{Vd}\right) \\ \Delta Vd = \Delta V \cdot \cos\beta \\ \Delta Vq = \Delta V \cdot \sin\beta \end{array} \right\} \qquad (2)$$

In the process of step S04, on the basis of an angular velocity co of the rotator, a d-axis inductance Ld, and a q-axis inductance Lq as represented in Equation (3), d-axis current difference component ΔIdα and q-axis current difference component ΔIqα are calculated on the dq coordinate from the d-axis voltage difference component ΔVd and the q-axis voltage difference component ΔVq.

$$\left. \begin{array}{l} \Delta Id\alpha = \dfrac{\Delta Vq}{\omega \cdot Ld} \\ \Delta Iq\alpha = \dfrac{\Delta Vd}{\omega \cdot Lq} \end{array} \right\} \qquad (3)$$

In the process of step S05, the d-axis current difference component ΔIdα and the q-axis current difference component ΔIqα are synthesized so that a composite current difference ΔI is calculated as represented in Equation (4) on the basis of the current phase angle cc corresponding to the phase angle β of the primary voltage V.

That is, when the primary voltage V is similar to the source voltage magnitude |Vom|, the source voltage on the voltage vector diagram will be described as represented in Equation (5).

$$\left. \begin{array}{l} \alpha = \tan^{-1}\left(\dfrac{Iq\alpha}{Id\alpha}\right) \\ |\Delta I| = \Delta Id\alpha \cdot \cos\alpha + \Delta Iq\alpha \cdot \sin\alpha \end{array} \right\} \qquad (4)$$

$$Vom = \sqrt{Vd^2 + Vq^2} \qquad (5)$$

Herein, the d-axis voltage instruction Vd and the q-axis voltage instruction Vq are described as represented in Equation (6) based on interlinkage flux Ψa. As a result, Equation (5) will be described as represented in Equation (7).

$$\left. \begin{array}{l} Vd = -\omega \cdot Lq \cdot Iq \\ Vq = \omega \cdot Ld \cdot Id + \omega \cdot \Psi a \end{array} \right\} \qquad (6)$$

$$\sqrt{(\omega \cdot Lq \cdot Iq)^2 + (\omega \cdot Ld \cdot Id + \omega \cdot \Psi a)^2} = Vom \qquad (7)$$

As represented in Equation (8), Equation (7) can be an expression of an ellipse having a center M (Id=−Ψa/Ld, Iq=0) for the d-axis current Id and the q-axis current Iq, and a source voltage can be a current limit ellipse (hereinafter, referred to as a voltage limit ellipse) by the voltage limit on the current vector diagram. With such a configuration, on the vector diagram, if the voltage is corrected toward the center of the source voltage (Vd=0, Vq=0), it means that the current is corrected toward the center M of the ellipse on the vector diagram.

$$(Lq \cdot Iq)^2 + (Ld \cdot Id + \Psi a)^2 = \left(\dfrac{Vom}{\omega}\right)^2 \qquad (8)$$

Figure 4:
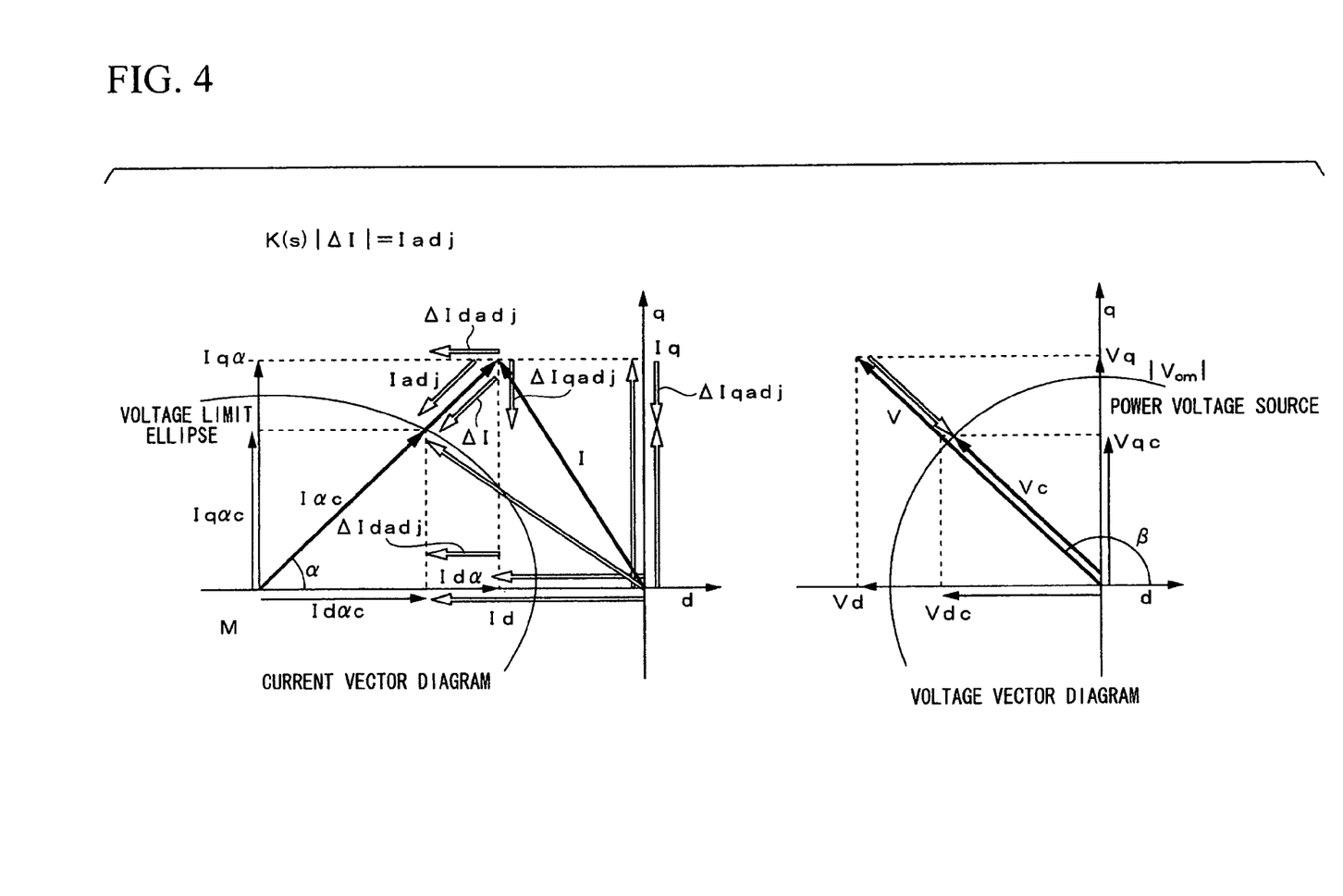
FIG. 4 is a graph illustrating an example of a voltage vector diagram and a current vector diagram according to the embodiment of the present invention.

In the process of step S06, as shown in FIG. 4, a predetermined control operation for a composite current difference ΔI is performed. For example, a computing of a control gain K(s) is performed and an amount of corrected composite current Iadj (=K(s)·ΔI) is calculated.

In the control calculation, since the control gain K(s) is calculated for the composite current difference ΔI, the current is limited on a line including and an end point (Id, Iq) of the current vector I and the center M of the voltage limit ellipse.

In the process of step S07, the amount of corrected current Iadj is decomposed into d corrected axis current component ΔIdadj and q corrected current component on the dq coordinate in accordance with the current phase angle α.

In the process of step S08, the corrected d-axis current component ΔIdadj subtracted from the d-axis target current Idc is set as the d-axis target current Idc and then the d-axis target current Idc is corrected so that the corrected current components ΔIdadj and ΔIqadj are zero. The value is changed into the q-axis target current Iqc by subtracting the corrected q-axis current component ΔIdadj from the q-axis target current Iqc so that the q-axis target current Iqc is corrected. With such a configuration, a series of processes are ended.

As mentioned above, according to the controller 10 of the permanent magnet type rotary motor, the controller 14 calculates the corrected d-axis current component ΔIdadj and the corrected q-axis component ΔIqadj so as to correct the d-axis target current Idc and the q-axis target current Iqc from the primary voltage difference ΔV which is a difference between the primary voltage and the maximum voltage. With such a configuration when the voltage magnitude of the primary voltage V is 180° or more, the maximum voltage can be converged less than the maximum voltage corresponding to the primary voltage V. Accordingly, it is possible to properly perform the electrification control, compared with the case of correcting only the d-axis target current Idc.

The controller 14 synthesizes the d-axis current difference component ΔIdα and the q-axis current difference component ΔIqα corresponding to the d-axis voltage component ΔVd and the q-axis voltage difference component ΔVq and calculates the composite current difference ΔI. The controller 14 decomposes the corrected current component ΔIadj obtained by multiplying the composite current difference ΔI by the control gain K(s) into the d-axis corrected current component ΔIdadj and the corrected q current component ΔIqadj, thereby correcting the d-axis target current Idc and the q-axis target current Iqc. With such a configuration, when a detection error of the phase angle or an angle deviation exists, it is possible to prevent the deviation in a correction direction of the currents in the current vector diagram using the dq coordinate.

In the embodiment, the d-axis target current Idc and the q-axis target current Iqc are corrected on the basis of the corrected composite current Iadj which is obtained by multiplying the composite current difference ΔI by the control gain K(s). However, the present invention is not limited to this. For example, the d-axis target current Idc and the q-axis target current Iqc can be corrected by the d-axis corrected current and the obtained by performing control operation for the d-axis corrected current and the q-axis corrected current corresponding to the d-axis voltage difference component ΔVd and the q-axis voltage difference component ΔVq.

In the motor controller 10 of the permanent type rotating electrical instrument according to the above-mentioned embodiment, the motor 11 is used for a driving source of the automobile. However, it is not limited to this. For example, the device can be used as a start motor or an alternator, which operates an internal-combustion engine of the automobile.

While a preferred embodiment of the present invention has been described and illustrated above, it should be understood that this is an exemplary of the present invention and is not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A controller of a permanent magnet type rotary motor, the controller comprising:
   a permanent magnet type rotary motor including a rotator which has a permanent magnet and a stator which has an armature generating a rotating magnetic field for rotating the rotator;
   a magnetic pole position detector detecting a magnetic pole position of the rotator;
   a current controller setting a phase of an armature voltage applied to the armature depending on the magnetic pole position and controlling an armature current flowing in the armature by a vector control using a rotatory magnetic flux coordinate in which a field direction of the rotator is defined as a field axis and a direction perpendicular to the field axis is defined as a torque axis;
   a current difference calculator decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference component, a field-axis inductance, and a torque-axis inductance; and
   a target current corrector correcting a field-axis target current and a torque-axis target current in the rotatory magnetic flux coordinate so that the current difference components are zero.

2. A controller of a permanent magnet type rotary motor, the controller comprising:
   a permanent magnet type rotary motor including a rotator which has a permanent magnet and a stator which has an armature generating a rotating magnetic field for rotating the rotator;
   a magnetic pole position detector detecting a magnetic pole position of the rotator;
   a current controller setting a phase of an armature voltage applied to the armature depending on the magnetic pole position and controlling an armature current flowing in the armature by a vector control using a rotatory magnetic flux coordinate in which a field direction of the rotator is defined as a field axis and a direction perpendicular to the field axis is defined as a torque axis;
   a current difference calculator decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference component, a field-axis inductance, and a torque-axis inductance;
   a composite current difference calculator compositing the current difference components on the basis of a current phase angle corresponding to the phase angle of the primary voltage and calculating a composite current difference; and
   a target current corrector correcting a field-axis target current and a torque-axis target current in the rotatory magnetic flux coordinate so that the composite current difference is zero.

3. The controller of a permanent magnet type rotary motor according to claim 2, wherein
   the target current corrector includes:
   a corrected composite current calculator performing a control operation on the composite current difference and calculating an amount of corrected composite current; and
   a corrected current calculator decomposing the amount of corrected composite current into a field-axis corrected current component and a torque-axis corrected current component in the rotatory magnetic flux coordinate by the use of the current phase, wherein the field-axis target current and the torque-axis target current are corrected so that the corrected current components are zero.

4. A control method of a permanent magnet type rotary motor including:
a permanent magnet type rotary motor including a rotator which has a permanent magnet and a stator which has an armature generating a rotating magnetic field for rotating the rotator;
a magnetic pole position detector detecting a magnetic pole position of the rotator; and
a current controller setting a phase of an armature voltage applied to the armature depending on the magnetic pole position, and controlling an armature current flowing in the armature by a vector control using a rotatory magnetic flux coordinate in which a field direction of the rotator is defined as a field axis and a direction perpendicular to the field axis is defined as a torque axis, the control method comprising:
a current difference calculating process of decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference components, a field-axis inductance, and a torque-axis inductance; and
a target current correcting process of correcting a field-axis target current and a torque-axis target current in the rotatory magnetic flux coordinate so that the current difference components are zero.

5. A control method of a permanent magnet type rotary motor including:
a permanent magnet type rotary motor including a rotator which has a permanent magnet and a stator which has an armature generating a rotating magnetic field for rotating the rotator;
a magnetic pole position detector detecting a magnetic pole position of the rotator; and
a current controller setting a phase of an armature voltage applied to the armature depending on the magnetic pole position, and controlling an armature current flowing in the armature by a vector control using a rotatory magnetic flux coordinate in which a field direction of the rotator is defined as a field axis and a direction perpendicular to the field axis is defined as a torque axis, the control method comprising:
a current difference calculating process of decomposing a primary voltage difference which is a difference between a primary voltage of the permanent magnet type rotary motor and a maximum voltage corresponding to a source voltage, into a field-axis voltage difference component and a torque-axis voltage difference component in the rotatory magnetic flux coordinate by the use of a phase angle of the primary voltage, and calculating a field-axis current difference component and a torque-axis current difference component in the rotatory magnetic flux coordinate by the use of the voltage difference components, a field-axis inductance, and a torque-axis inductance;
a composite current difference calculating process of compositing the current difference components on the basis of a current phase angle corresponding to the phase angle of the primary voltage, and calculating a composite current difference; and
a target current correcting process of correcting a field-axis target current and a torque-axis target current in the rotatory magnetic flux coordinate so that the composite current difference is zero.

6. The control method of a permanent magnet type rotary motor according to claim 5, wherein:
the target current correcting process includes:
a composite current corrected amount calculation process of performing a control operation on the composite current difference, and calculating an amount of corrected composite current; and
a corrected current amount calculation process of decomposing the amount of corrected composite current into a field-axis corrected current component and a torque-axis corrected current component in the rotatory magnetic flux coordinate by the use of the current phase angle; and
a correcting process of correcting the field-axis target current, and wherein
the control method of a permanent magnet type rotary motor further comprising a correcting process of correcting the field-axis corrected current component and the torque-axis target current so that the corrected current components are zero.

* * * * *